No. 780,853. PATENTED JAN. 24, 1905.
M. E. ANDERSON.
ADDING AND SUBTRACTING MACHINE.
APPLICATION FILED MAR. 17, 1904.
2 SHEETS—SHEET 1.
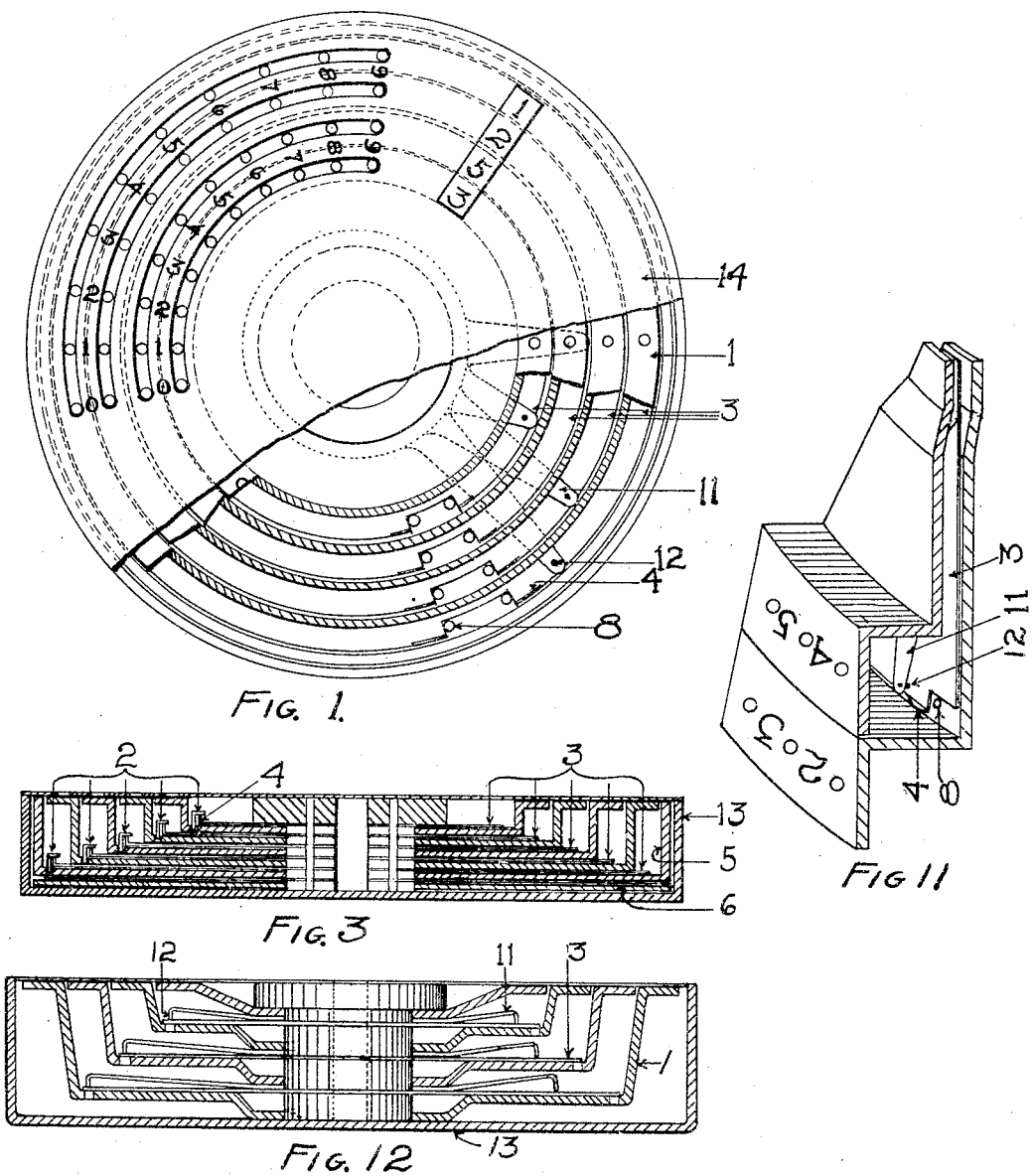
WITNESSES:
Martin E Anderson
INVENTOR No. 780,853. PATENTED JAN. 24, 1905.
M. E. ANDERSON.
ADDING AND SUBTRACTING MACHINE.
APPLICATION FILED MAR. 17, 1904.

2 SHEETS—SHEET 2.

WITNESSES:
Geo. R. Kenington.
C. B. Graham.

Martin E. Anderson
INVENTOR

No. 780,853.                                              Patented January 24, 1905.

UNITED STATES PATENT OFFICE.

MARTIN E. ANDERSON, OF WASHINGTON, DISTRICT OF COLUMBIA.

ADDING AND SUBTRACTING MACHINE.

SPECIFICATION forming part of Letters Patent No. 780,853, dated January 24, 1905.

Application filed March 17, 1904. Serial No. 198,538.

*To all whom it may concern:*

Be it known that I, MARTIN E. ANDERSON, a citizen of the United States, residing at Washington, District of Columbia, have invented a new and Improved Adding and Subtracting Machine, of which the following is a specification.

My invention relates to improvements in concentric-disk adding and subtracting machines; and my improvements consist in the particular shape of disk used and in the method employed to transmit motion from one disk to the other.

The objects of my invention are to produce a machine that is compact, convenient to operate, accurate, cheap, positive in its action and one that will permit several columns to be added or subtracted at one time. I attain these objects by the mechanism illustrated in the accompanying drawings, in which—

Figure 2:
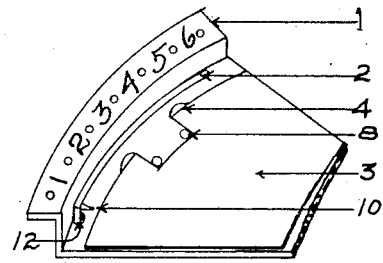
Figure 5:
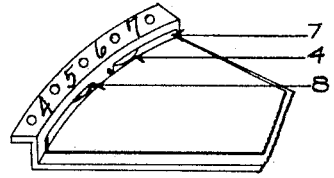
Figure 7:
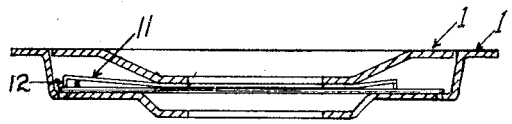
Figure 8:
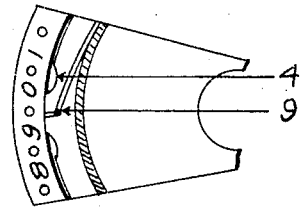
Figure 4:
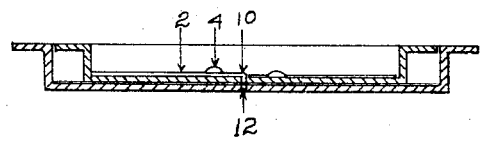
Figure 6:
Figure 9:
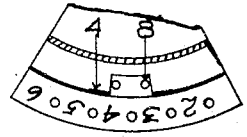

Figure 1 is a plan having part of the cover and flanges of the disks broken away that the mechanism may be seen. Fig. 3 is a section through the center of the machine, showing the shape and arrangement of disks and the modified transmission mechanism of Fig. 2. Fig. 7, Fig. 9, Fig. 10, and Fig. 11 show in detail the preferred method of construction. Fig. 6 shows a modification of the preferred construction. Fig. 5 and Fig. 8 show a second modification. Fig. 2 and Fig. 4 show a third modification.

Similar numbers refer to similar parts throughout the several views.

Figure 10:
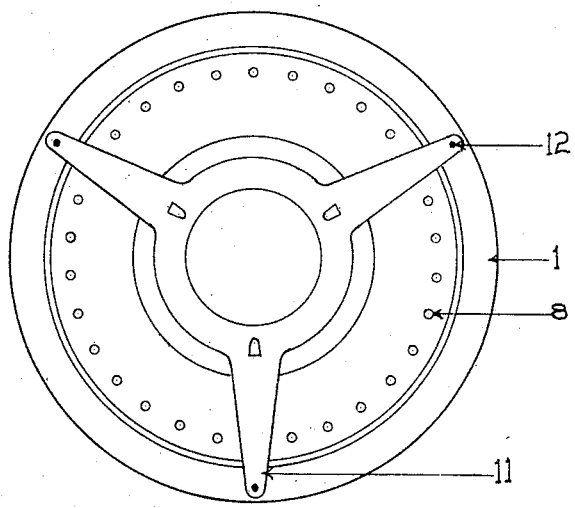

Figs. 1 and 3 show that the machine is made up of two or more concentric cup-shaped rotating disks 1, having flanges around the upper edge, one cup-shaped rotating disk 5, which has no flange around upper edge, and one plain rotating disk 6. These disks 1, 5, and 6 all revolve about a center pivot (shown on a larger scale in Fig. 12) in which 13 is the base-plate, 1 the revolving disks, and 3 the stationary plates which are clamped in between the different washers composing the pivot. Each disk 1 has its flange divided into equal spaces—always some multiple of ten—and small pin-holes are drilled part way through the flange at each division-line. Between the holes thus formed are stamped, engraved, or painted the numbers "0, 1, 2, 3, 4, 5, 6, 7, 8, 9." Each disk, except the first or units disk, has another series of equally-spaced holes 8 on its bottom plate. These holes are for the purpose of permitting one disk to transmit motion to the other in a manner to be hereinafter described. The several disks are separated by stationary disks 3, clamped by the pivot, as previously explained. These disks 3 have each one or more notches cut in them. These notches have a width of slightly more than the distance between centers of holes 8 plus the diameter of holes. (See Fig. 2, Fig. 5, and Fig. 9.) On each side of the notches small ears 4 are provided. These "ears" are turned up at right angles to the part of the plate in which the notch is cut, forming inclines. The inclines formed by the turned-up ears 4 are for the purpose of unlocking the disks in a manner hereinafter described. Each disk except the last has secured thereto one or more springs 11, Figs. 7, 10, and 11. (The number of springs 11 and pins 12 required is equal to the number of holes in the flange of disk divided by ten times the number of notches in plate 3.) Each one of these springs 11 has a pin 12 projecting from its under side. All the springs may be formed in one piece, as shown in Fig. 10. The pins 12 are the same distance from the center as the holes 8 in the disk below and when the spring 11 moves over the notch in plate 3 pin 12 is forced into a hole 8 in the under disk and locks the two disks together, so that one turns the other one space. When the end of spring 11 reaches the incline formed by the ear 4, it is lifted up and the pin 12 is withdrawn from the hole 8. After the spring 11 leaves the incline 4 the pin 12 slides on plate 3 until it is again over the notch, when it operates once more. By using two inclines—one on each side of notch—the operation of addition and subtraction can both be performed on the same machine.

Having thus described the mechanism of one method of construction, I shall now describe the operation of addition and subtraction. For this purpose we shall consider that the smallest disk represents units, and the next tens, &c.

Let us add two numbers of four figures each—as, for example, "6248+1453." We would place our pencil in the pin-hole of the fourth disk opposite number "6," and move that hole to "0." We would next move the third or hundreds disk two spaces, the tens-disk four, and the units-disk eight spaces. The total would now read "6248." To add to this sum "1453," we would proceed as before, and after adding "1450" the total would read "7698." By adding the three units it will be seen that both the tens and hundreds disks must move, as well as the units-disk. Thus when one unit had been added, making the total "7699," the pin 12 in spring 11 of the units and tens disks would be in position to drop into holes 8 in the tens and hundreds disks, respectively. Adding one more unit to "7699" would require the three disks to move, making a total of "7700." Adding the remaining unit would of course affect only the units-disk, and the machine would show a total of "7701." Subtraction, being the reverse of addition, differs only in that the disks are rotated in the reverse direction.

It is obvious that several modifications may be made in the construction, all of which, however, would necessarily retain all the essential features—i. e., the cup-shaped rotating disks with flanges to provide space for the mechanism and for making the top of machine a plane surface, the stationary disks 3 for preventing one disk from moving the other except when and as much as desired, the spring 11 and pin 12 for engaging with the other disks, and the inclines or ears 4 for raising pin 12 from its engagement with holes 8 of the other disk. One modification is shown in Fig. 6. The spring operating-pin 12 is here secured to the under side of flange and has a projection at right angles to pin 12 for engaging with the inclined ears 4. In this construction the springs may be stamped out of an annular ring and secured to under side of flange by rivets or screws.

Fig. 5 and Fig. 8 show a second modification. In this case the stationary disk 3 is made cup-shaped and the notch is cut in the vertical side. The holes 8 are on the vertical side of the rotating disks, as shown in Fig. 5. The spring is secured to the vertical side of the disk, as shown in Fig. 8.

Fig. 2 and Fig. 4 show a third modification in which the stationary disks 3 are made somewhat smaller and the springs 2 are secured in the angle between the bottom and side of disk. The pin 12 passes through a hole in bottom of disk, while a projection 10 is provided which engages with the inclines 4 4. A working model has been constructed on this plan. This modification permits one more disk, 6, to be operated without increasing the diameter of the machine.

Having thus described my invention, what I claim as new, and desire to secure by Letters Patent, is—

In an adding and subtracting machine the combination of concentric cup-shaped rotating disks having flanges around the upper edge; stationary disks provided with one or more notches and two inclines or ears for each notch; a spring or springs, each provided with a pin for engaging with the other revolving disk, made from a piece of spring metal cut so as to have one or more radiating arms, and a pivot composed of separate washers for clamping the stationary disks, all as described in this specification and shown on drawings.

In testimony whereof I have signed my name to this specification in the presence of two subscribing witnesses.

MARTIN E. ANDERSON.

Witnesses:
  WILKES C. PRATHER,
  LEONARD G. HOFFMAN.